3,063,819
FUEL COMPOSITION

William A. L. Watt, Chester, and John C. Moseley, Wirral, England, assignors to Shell Oil Company, a corporation of Delaware
No Drawing. Filed Dec. 12, 1958, Ser. No. 779,837
Claims priority, application Great Britain May 30, 1958
9 Claims. (Cl. 44—72)

This invention relates to improved fuel compositions, particularly such fuels for use in internal combustion engines.

Commercial liquid fuels, such as hydrocarbon fuels, suitable for use in internal combustion engines invariably contain small amounts of water, either dissolved or dispersed in the product. This is because it is virtually impossible to prevent contact of the product with water during blending operations, storage, and transportation to the consumer. Also, even if the greatest precautions to prevent any such contact were taken, water would still be absorbed from the atmosphere. The presence of a small amount of water as such is not normally deleterious; however, when the product is cooled, ice particles often are formed.

The formation of ice in such fuels is usually at least troublesome and often is extremely dangerous. For example, all vehicles powered by gasoline, kerosene, jet fuel or diesel fuel are normally provided with filters, such as filter screens and micronic filters, in the fuel system, so as to prevent the passage of solid contaminants, for example, small particles of rust, into the engine. When ice is formed in the fuel, often it will plug the filters, thus stopping the flow of fuel to the engine. In the case of vehicles operating on the ground or water surface, this is at least inconvenient; but in aircraft such stoppage, of course, involves a grave risk to human life. Because of this danger, most aircraft are provided with an automatic by-pass around the fuel system filters. However, on the opening of the by-pass, the ice is passed through to injector mechanisms and the like, which contain close and critical tolerances. Here, the ice causes still further difficulties, including malfunctioning of these mechanisms.

Another fuel system mechanism which is particularly prone to malfunctioning due to plugging with ice is the carburetor. At this point in the fuel system, additional moisture is introduced from the air for combustion. Even though both liquid fuel and air temperatures are above 32° F., the evaporation of the fuel in the carburetor will often cool the system to 32° F. or below, especially at a time soon after starting the engine, whereupon ice will form and will frequently cause the engine to stall because of the blocking of fuel and air passages by the ice.

Heretofore, these difficulties have sometimes been alleviated by incorporating into the fuel certain water-soluble freezing point depressants, such as low molecular weight alcohols, including glycols, or the like. However, this requires relatively large concentrations of the freezing point depressant which are not only uneconomical but also often adversely affect the chemical and physical properties of the fuel. Additionally, the high affinity of these compounds for water makes them susceptible to removal from the fuel by the "leaching" action of the free water with which the fuel usually comes in contact during storage. Furthermore, such compounds, when incorporated into the fuel act as solubilizers for water, thus actually increasing the amount of water which the fuel will absorb during commercial handling. Although this is by no means desirable, the alcohols, for example, isopropyl alcohol, still are somewhat effective in decreasing the incidence of stalling of automobiles due to carburetor icing. But in the case of aircraft applications, wherein filter clogging is particularly critical and temperatures are unusually low, the increased concentration of water in the fuel over-balances the benefit of the freezing point depressant, so the addition of the latter often aggravates rather than alleviates the problem.

It is accordingly a principal object of this invention to provide an improved liquid fuel composition. A more particular object is to provide such a composition which has improved characteristics with respect to ice formation therein. Still another object of the invention is to provide a hydrocarbon composition with improved characteristics with respect to ice formation therein and which does not require a high concentration of an anti-icing additive. Other objects will be apparent from the description of the invention.

It has now been discovered that these and other objects are obtained by the addition to liquid fuels for internal combustion engines, of a minor amount, i.e., less than 2 percent by weight, of a material of a certain class of organic condensation products to be described with particularity hereinafter.

The exact way that the additive alleviates icing difficulties is not known. Since the water solubility of the additive appears not to determine its effectiveness, and since the additive is sometimes actually insoluble in water, the mechanism is not that of a freezing point depressant. Thus, it may not actually prevent the formation of ice when the hydrocarbon fuel is cooled. However, even if the ice still forms, it has been found that the presence of the additive of the invention prevents, or at least reduces, plugging of screens and interference with the operation of pumps, injector mechanisms, carburetors, and the like.

The liquid essentially hydrocarbon base fuel which is the major component of the composition of the invention can be any hydrocarbon or mixture of hydrocarbons and non-hydrocarbon fuel components boiling substantially within the liquified petroleum gas, gasoline, kerosene, jet fuel and diesel fuel boiling range, that, is, those with normal boiling points within the range of from about −60° F. to about 700° F. The invention is particularly directed to mixtures of hydrocarbons within an ASTM boiling range of from about 90° F. to about 425° F., such as gasoline, and especially such as aviation gasoline, which normally has an ASTM boiling range of from about 100° F. to about 350° F. More especially, the gasolines in which the additives of the invention are most advantageously incorporated are the more volatile gasolines which have 50% distillation points (ASTM D–86) no greater than about 270° F., especially no greater than 240° F., and particularly about 190° F. The gasoline fuel can also suitably contain minor amounts of non-hydrocarbon blending agents such as up to 20 or 30% by volume of volatile alcohols and ethers. Such a gasoline will still retain its essentially hydrocarbon character for the purposes of the invention. The additives are also suitably and usefully incorporated into special boiling point solvents, paint thinners, gas condensate well products, liquified propane or butane tractor fuels and the like.

The additive of the invention is a condensation product of an alkanolamine and an alkylene oxide or an ester or ether of such a condensation product. The condensation product can be derived from any alkanolamine such as mono-, di-, or tri-ethanolamine, mono-, di-, or tri-isoor tri-normal propanolamine, and the corresponding butanolamines and higher homologs. Preferred starting materials are the ethanolamines and the propanolamines, particularly, mono-isopropanolamines. The alkylene oxide used can be, for example, ethylene oxide, 1,2- or 1,3-propylene oxide or a butylene oxide or a higher homolog thereof. Substituted alkylene oxides, such as styrene oxide can also be used and the term "alkylene oxide" used herein is to be construed accordingly.

The condensation products can be derived from a mixture of alkanolamines or from a mixture of alkylene oxides. They can be made by condensing one alkylene oxide, for example 1,2-propylene oxide, with an alkanolamine, and then condensing a different alkylene oxide, for example ethylene oxide, with that intermediate condensation product.

The condensation products can be made by any of the known methods for condensing alkylene oxides with compounds containing active hydrogen atoms. Their molecular weight can be easily controlled, and products having average molecular weights of at least about 100, more especially at least 500, are preferred. Moreover, products having average molecular weights of up to about 5000, particularly up to about 4000, are preferred. A minimum of 1500 average molecular weight is especially preferred.

The condensation products can, moreover, be esterified or etherified before use as additives in the present invention. Thus they can be esterified with fatty acids such as acetic, propionic or lauric acid. The triacetyl derivatives of the condensation products of an isopropanolamine and 1,2-propylene oxide are particularly effective. The esterification or etherification can be complete, i.e. all three hydroxyl groups reacted, or only partial.

In general, the condensation products will be of the formula:

$$H_{3-x}N[-R(OR_1)_n(OR_2)]_x$$

wherein R is an alkylene group having preferably not more than 12 carbon atoms and especially not more than 8 carbon atoms; $R_1$ is an alkylene group, preferably unsubstituted, having at least 2 carbon atoms and preferably not more than 12 and particularly not more than 8 carbon atoms; $R_2$ is preferably a hydrogen atom, but can be an organic radical containing only carbon hydrogen and oxygen atoms such as an acyl, alkyl, aryl, or alkaryl group; $x$ is an integer at least 1 and not more than 3 and preferably 3; and $n$ is an integer at least 1 and preferably 5 to 125 and more particularly 20 to 90. When $R_2$ is an organic radical, it is preferred that the radical have less than 24 carbon atoms and it is especially preferred that the radical contain less than 12 carbon atoms. The organic $R_2$ is preferably an acyl radical, i.e., whereby the additive will be an ester. Condensation products found to be especially suitable are those wherein R and $R_1$ are 1,2- or 1,3-alkylene groups.

A particularly useful condensation product for use in the present invention is prepared as follows: 225 parts by weight of mono-isopropanolamine containing 9 parts by weight of flake caustic potash dissolved in it are charged into a reactor which is then purged with methane. The contents of the reactor are heated and agitated and, when the temperature reaches 90 to 100° C., the reactor is closed. 1,2-propylene oxide is then introduced into the reactor until the pressure reaches 50 p.s.i.g., and the pressure is then maintained in the range of 40 to 50 p.s.i.g. by passing in 1,2-propylene oxide while maintaining the reaction temperature at 110° C. The end point of the reaction for obtaining a condensate of any particular molecular weight is determined approximately by the volume of the product, but this is checked by the viscosity of the de-gassed product, there being a direct relationship between viscosity and molecular weight.

When the required molecular weight has been attained, the 1,2-propylene oxide supply is shut off and the temperature maintained at 110° C until the pressure falls to 10 p.s.i.g. Unreacted gas is purged from the system and the residual catalyst is neutralized by the addition of activated clay at 100° C. Final traces of 1,2-propylene oxide are removed under vacuum at 100° C. and the product is finally filtered at 40° C.

It will be noted that the starting material in the above preparation was mono-isopropanolamine and it will be appreciated that, when starting with such a material, the tri-isopropanolamine is first formed and subsequent alkylene oxide groups add on to the three free hydroxyl groups. In fact, di-isopropanolamine or tri-isopropanolamine can be used as a starting material.

The acetyl derivative of the aforementioned condensation product may be prepared as follows: 167 parts by weight of a condensation product of 1,2-propylene oxide with mono-isopropanolamine having a molecular weight of about 2000 are heated under reflux for two hours at 95° C. with 51 parts by weight of acetic anhydride and 93 parts by weight of pyridine. After cooling, 300 parts by volume of water are added and the mixture stirred for another hour at 95° C. The acetylated product is extracted with 300 parts by volume of petroleum spirit (boiling point 60 to 80° C.) and the petroleum spirit solution washed with normal hydrochloric acid and then with water. The petroleum spirit is dried azeotropically and the solvent removed by distillation under reduced pressure.

Condensation products can also be formed by cyclizing two hydroxyalkyl groups in a trialkanolamine such as triethanolamine and condensing the product, now containing a cyclic ether group and only one hydroxyalkyl group, with an alkylene oxide, as described above.

The proportion of additive used in the fuel will generally lie between 0.001% and 2% by weight based on the weight of the hydrocarbon fuel. Preferably the proportion used will be between 0.005% and 0.1% by weight, whereby a usually adequate benefit is obtained without uneconomically excessive concentrations.

Most of the condensation products of the afore-mentioned types are readily soluble in hydrocarbon fuels, but, if it is necessary to use them in quantities greater than their solubility allows, then they can be used in conjunction with an organic solvent which is miscible both with the hydrocarbon fuel and with the condensation product. Suitable solvents are the alcohols, such as ethyl alcohol, isopropyl alcohol and methyl alcohol, polyhydric alcohols, such as ethylene glycol, ketones, such as acetone and methyl ethyl ketone, ethers, such as diethyl and di-isopropyl ethers, and the methyl and ethyl ethers of ethylene glycol, 1,3- and 1,4-dioxanes and aromatic hydrocarbons, such as benzene, toluene, or xylene.

The organic solvent used is preferably one which will itself improve the characteristics of the hydrocarbon fuel with respect to ice formation. For this reason, isopropyl alcohol is particularly suitable. The organic solvent is preferably used in the proportion of between 0.01% and 5% by weight of the hydrocarbon fuel.

The hydrocarbon fuel compositions of this invention can, and ordinarily will, contain other additives, such as the common commerical additives, for example anti-detonants such as tetra ethyl lead, iron carbonyl, dicyclopentadienyl iron, xylidine, N-methyl aniline and methylcyclopentadienyl manganese tricarbonyl, lead scavengers such as ethylene dibromide and ethylene dichloride, dyes, spark plug anti-foulants such as tricresyl phosphate, dimethyl xylyl phosphate, n-octyl diphenyl phosphate, and diphenyl cresyl phosphate, combustion chamber deposit modifiers such as alkyl boronic acids and lower alkyl phosphates, phosphites, and phosphines, such as tributyl phosphate and tributyl phosphine, oxidation inhibitors such as N,N'-disecondary-butyl phenylenediamine, N-n-butyl-p-aminophenol and 2,6- ditertiary-butyl-4-methyl phenol, metal deactivators such as N-N'- disalicylal-1,2-propanediamine, and rust inhibitors such as polymerized linoleic acids and N,C-disubstituted imidazolines.

The present invention is illustrated by the following examples which, however, should not be considered limitations thereof.

Example I

A motor gasoline which possessed an A.S.T.M. 50% distillation temperature of 201° F. (94° C.), which had a Reid vapor pressure of 12.5 pounds per square inch and which consisted of 84% by volume of catalytically cracked gasoline hydrocarbons, 8% by volume of catalytically reformed gasoline hydrocarbons and 8% by volume of butane was employed in this example as the base fuel.

A condensation product of 1,2-propylene oxide and mono-isopropanolamine having a molecular weight of 2000 and a kinematic viscosity of 164 centistokes at 100° F. was dissolved in a concentration of 0.0135% by weight in the base fuel to give an improved fuel composition of the invention.

The aforementioned fuel composition and also the base fuel were tested according to the following carburetor icing bench test in a Hillman Minx Mk. VII engine.

In the carburetor icing bench test, the Hillman Minx Mk. VII engine (fitted with a Solex carburetor) was run on a cruise/idle cycle while being supplied with cold moist air. (The humidity and temperature of the air at the beginning of each test were controlled by the temperature of the cold room from which the air was drawn, and by the temperature rise in the trunking which led the air to the engine.) At the start of the test the temperature of the air which was 35° F. and its relative humidity was 80%, a combination of atmospheric conditions which is known to lead to carburetor icing very frequently in practice.

After starting, the engine was run under cruising conditions, equivalent to 30 m.p.h. on the road, for an "initial cruise period" of 3 minutes. During the test, the inlet air temperature was gradually raised to simulate the rise in engine compartment air temperature in practice. A running cycle, consisting of alternative periods of idling (15 seconds) and cruising (1½ minutes), was meanwhile maintained. This was maintained until the engine idled smoothly. The number of cycles completed before the engine idled smoothly was taken as a measure of the effectiveness of the additive under test.

The numbers of such cycles in each of these tests are set out below.

| Fuel: | Number of cycles before engine idles smoothly |
|---|---|
| Base fuel | 11 |
| Fuel of Example I | 0 |

Immediately after the test on the fuel of Example I, the test was repeated on the same engine using the base fuel again. This time the number of cycles before the engine idled smoothly was only 2, showing that the additive has a pronounced "carry-over" effect.

Example II

The above test was repeated with the base fuel of Example I containing 0.0067% by weight of the condensation product referred to in that example and also with the base fuel itself, with the results set out below.

| Fuel: | Number of cycles before engine idles smoothly |
|---|---|
| Base fuel | 11 |
| Fuel of Example II | 6 |

Immediately after the test on the fuel of Example II, the test was repeated on the same engine again using the fuel of Example II. This time the number of cycles before the engine idled smoothly was only 1, showing that the effectiveness of the additive is accumulative.

Example III

Example I was repeated using 0.0135% by weight of a condensation product of 1,2-propylene oxide and mono-isopropanolamine having a molecular weight of 4000. The number of cycles before the engine idled smoothly in the carburetor icing bench test was 3.

Example IV

Example I was repeated using 0.0135% by weight of the triacetyl derivative of the additive used in Example III. The number of cycles before the engine idled smoothly in the carburetor icing bench test was 4.

Example V

In order to investigate the benefits of various additives in decreasing the tendency of fuel filters to plug with ice, a fuel filter icing test was designed as follows. The apparatus consists of a constant flow pump which forces a white oil into a first glass vessel, initially filled with water. The water thus displaced is introduced into a second glass vessel, initially filled with the hydrocarbon fuel to be tested. The fuel thus displaced from the second vessel is passed through a heat exchanger, where its temperature is reduced to the desired level, usually between about 0° F. and −20° F., and immediately thereafter through a 10 micron paper filter (Bendix Skinner Division, Bendix Aviation Corporation, Part No. 568,509). In this manner the fuel is kept in contact with water, the air is excluded, thus avoiding any change in water concentration in the fuel. The flow rate of the fuel through the filter is held constant in all tests at 38 cc. per minute. The pressure differential across the filter at any time is therefore a measure of the degree to which the filter is plugged with ice.

The elapsed time before this differential pressure has reached 16 cm. Hg was selected as a measure of the ability of the hydrocarbon product to avoid plugging of the filter with ice. The higher this figure, of course, the better the hydrocarbon product.

It has been found that variations in filter temperature between 0° F. and −20° F. do not have a substantial effect on the elapsed time before filter plugging in this test.

When aviation gasoline specification MIL-F-5572 (115/145 grade), jet fuel (i.e., aviation turbine fuel) specification MIL-F-5624B (JP-5), and diesel fuel, are tested according to this procedure with and without the additives used in Examples I, III, and IV, the time for the pressure differential across the filter to reach 16 cm. Hg is seen to be increased in each case by the incorporation of any one of these additives in concentrations of 0.005 and 0.0135 percent by weight.

The following are additional examples of compositions according to the present invention:

Example VI

Motor gasoline having 190° F. ASTM 50% distillation point and containing, per gallon:

2.5 cc. tetraethyl lead
1.0 theory ethylene dibromide
0.06 g. N,N'-disecondarybutyl p-phenylene diamine
1.85% w. tris [hydroxypropyl poly(oxypropylene)]amine having an average molecular weight of 2000

Example VII

Motor gasoline having 270° F. ASTM 50% distillation point and containing, per gallon:

2.0 cc. tetraethyl lead
1.0 theory ethylene dibromide
0.5 theory ethylene dichloride
0.015% w. tris [hydroxypropyl poly(oxyethylene)]amine having an average molecular weight of 4000.
0.06 g. N-butyl-p-aminophenol

Example VIII

Motor gasoline consisting of gasoline boiling range hydrocarbons, 15% v. diisopropyl ether and containing, per gallon:
1.5 cc. tetraethyl lead
1.0 theory ethylene dibromide
0.3 theory tricresyl phosphate
0.02% w. tris [hydroxyethyl poly(oxyethylene)]amine having an average molecular weight of 500
0.06 g. N,N'-disecondarybutyl-p-phenylene diamine
1.0 p.p.m. by wt. dimethyl polysiloxane fluid having a viscosity at 25° C. of 500 centistokes

Example IX

100/130 grade aviation gasoline containing, per gallon:
4.0 cc. tetraethyl lead
1.0 theory ethylene dibromide
0.0015% w. acetylated tris [hydroxypropyl poly(oxypropylene)]amine having an average molecular weight of 5000
0.04 g. 2,4-dimethyl-6-tertiarybutylphenol

Example X

Aviation turbine fuel containing:
0.01% w. tris [hydroxypropyl poly(oxyphenylethylene)]-amine having an average molecular weight of 1500

Example XI

115/145 aviation gasoline containing, per gallon:
4.6 cc. tetraethyl lead
1.0 theory ethylene dibromide
0.0135% w. ethylated tris [hydroxypropyl poly(oxyethylene)]amine having an average molecular weight of 4000
0.06 g. 2,4-dimethyl-6 tertiarybutylphenol

Example XII

Jet fuel (JP-4) containing:
0.85% w. bis [hydroxyethyl poly(oxypropylene)]amine having an average molecular weight of 1500

Example XIII

Liquified petroleum gas bus fuel containing:
0.015% w. tris [hydroxybutyl poly(oxyethylene)]amine having an average molecular weight of 4000

Example XIV

Motor gasoline containing, per gallon:
2.9 cc. tetraethyl lead
1.0 theory ethylene dibromide
0.06 g. N,N'-dibutyl p-phenylene diamine
4.0% w. isopropyl alcohol
0.01% w. octadecylated tris [hydroxybutyl poly(oxypropylene)] having an average molecular weight of 5000
2.0 theories octyl diphenyl phosphate
1.0 p.p.m. by wt. dimethyl polysiloxane fluid having a viscosity at 25° C. of 12,500 centistokes

Example XV

Diesel fuel having API gravity of 35° and ASTM initial and end point of 375 and 690° F., respectively, and containing:
0.5% w. phenylated tris [hydroxyethylene poly(oxypropylene)]amine having an average molecular weight of 4000

Example XVI 80 octane aviation gasoline containing, per gallon:
0.5 cc. tetraethyl lead
1.0 theory ethylene dibromide
1.0% w. lauroylated tris [hydroxypropylene poly(oxypropylene)]amine having an average molecular weight of 4000

Example XVII

Motor gasoline containing, per gallon:
2.9 cc. tetraethyl lead
1.0 theory ethylene dibromide
0.06 g. N.N'-disecondarybutyl-p-phenylene diamine
0.025% w. monohydroxyethyleneoxyethylene amine

We claim as our invention:

1. A liquid hydrocarbon fuel boiling within the range of about −60° F. to about 700° F. containing at least about 0.001% and less than about 2% by weight based on the weight of the fuel of a condensation product of an alkanolamine and an alkylene oxide, said condensation product having a molecular weight of from about 100 to about 5000 and having the formula:

$$H_{3-x}N[-R(OR_1)_nOR_2]_x$$

wherein R is an alkylene group having on more than 12 carbon atoms, $R_1$ is an alkylene group containing 2 to 12 carbon atoms, $R_2$ is selected from the group consisting of a hydrogen atom and an organic radical containing 1 to 24 carbon atoms and selected from the group consisting of acyl, alkyl, aryl, and alkaryl, $x$ is at least 1 and no more than 3, and $n$ is at least 1.

2. A liquid hydrocarbon fuel composition in accordance with claim 1 wherein the fuel is gasoline.

3. A liquid hydrocarbon fuel composition in accordance with claim 1 wherein the fuel is an aviation turbine fuel.

4. A liquid hydrocarbon fuel boiling within the range of about −60° F. to about 700° F. containing at least about 0.005% and less than about 0.5% by weight based on the weight of the fuel of a condensation product of an alkanolamine and an alkylene oxide, said condensation product having a molecular weight of from about 100 to about 5000 and having the formula:

$$H_{3-x}N[-R(OR_1)_nOR_2]_x$$

wherein R is an alkylene group having no more than 8 carbon atoms, $R_1$ is an alkylene group containing 2 to 8 carbon atoms, $R_2$ is selected from a group consisting of a hydrogen atom and an organic radical containing at least 1 and not more than 12 carbon atoms and selected from the group consisting of acyl, alkyl, aryl, and alkaryl, $x$ is at least 1 and not more than 3, and $n$ is at least 1.

5. A liquid hydrocarbon fuel boiling within the range of about −60° F. to about 700° F. containing at least about 0.005% and less than about 0.1% by weight based on the weight of the fuel of a condensation product of an alkanolamine and an alkylene oxide, said condensation product having a molecular weight of from about 100 to about 5000 and having the formula:

$$H_{3-x}N[-R(OR_1)_nOR_2]_x$$

wherein R is a 1,2-alkylene group having no more than 4 carbon atoms, $R_1$ is a 1,2-alkylene group containing 2 to 4 carbon atoms, $R_2$ is a hydrogen atom, $x$ is 3, and $n$ is at least 1.

6. A liquid hydrocarbon fuel composition in accordance with claim 5 wherein $R_2$ is an acyl group containing 1 to 12 carbon atoms.

7. A liquid hydrocarbon fuel composition in accordance with claim 5 wherein $R_2$ is an alkyl group containing 1 to 12 carbon atoms.

8. A liquid hydrocarbon fuel boiling within the range of about −60° F. to about 700° F. containing at least about 0.001% and less than about 0.1% by weight based on the weight of the fuel of a condensation product of propanolamine and 1,2 propylene oxide, said condensation product having a molecular weight of from about 1500 to about 4000.

9. A liquid hydrocarbon fuel composition in accordance with claim 8 containing the tri-acetyl derivative of said condensation product.

References Cited in the file of this patent

UNITED STATES PATENTS

| | | |
|---|---|---|
| 1,970,578 | Schoeller et al. | Aug. 21, 1934 |
| 2,706,677 | Duncan et al. | Apr. 19, 1955 |
| 2,872,303 | Donlan | Feb. 3, 1959 |
| 2,902,354 | Giammaria | Sept. 1, 1959 |
| 2,906,613 | Mills | Sept. 29, 1959 |

OTHER REFERENCES

Petroleum Refining With Chemicals, Kalichevsky and Kobe, Elsevier Pub. Co., 1956, page 480.